United States Patent
Hoppe et al.

(10) Patent No.: US 9,845,887 B2
(45) Date of Patent: Dec. 19, 2017

(54) SLIDE RING SEAL

(75) Inventors: Steffen Hoppe, Overath (DE); Andreas Dengler, Friedberg (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 124 days.

(21) Appl. No.: 13/516,323

(22) PCT Filed: Dec. 2, 2010

(86) PCT No.: PCT/DE2010/001411
§ 371 (c)(1),
(2), (4) Date: Jun. 15, 2012

(87) PCT Pub. No.: WO2011/072640
PCT Pub. Date: Jun. 23, 2011

(65) Prior Publication Data
US 2012/0248706 A1   Oct. 4, 2012

(30) Foreign Application Priority Data
Dec. 15, 2009 (DE) .......... 10 2009 058 315

(51) Int. Cl.
*F16J 15/34* (2006.01)

(52) U.S. Cl.
CPC .................... *F16J 15/344* (2013.01)

(58) Field of Classification Search
CPC ...... F16J 15/3496; F16J 15/344; F16J 15/441; F16J 15/3412; F16J 15/342; F16J 15/3244; F16J 15/3404
USPC ........................ 277/404–406, 399
See application file for complete search history.

(56) References Cited

U.S. PATENT DOCUMENTS

| | | | | |
|---|---|---|---|---|
| 3,086,782 A | * | 4/1963 | Peickii et al. | ............ 277/398 |
| 3,392,984 A | * | 7/1968 | Reinsma | ............ B62D 55/0887 |
| | | | | 277/380 |
| 3,542,377 A | * | 11/1970 | Voitik | ............ 277/380 |
| 3,623,737 A | * | 11/1971 | Eckert | ............ F16J 15/344 |
| | | | | 277/382 |
| 3,767,214 A | * | 10/1973 | Kawamura | ............ B62D 55/15 |
| | | | | 277/358 |
| 3,905,606 A | | 9/1975 | Florjancic | |
| 3,985,366 A | * | 10/1976 | Plouzek | ............ F16J 15/344 |
| | | | | 277/367 |

(Continued)

FOREIGN PATENT DOCUMENTS

| | | |
|---|---|---|
| DE | 1928675 A1 | 2/1970 |
| DE | 22 22082 A1 | 11/1973 |

(Continued)

OTHER PUBLICATIONS

Trapezoid—definiton by The Free dictionary.*

(Continued)

*Primary Examiner* — Nathan Cumar
(74) *Attorney, Agent, or Firm* — Robert L. Stearns; Dickinson Wright, PLLC

(57) ABSTRACT

The invention relates to a slide ring seal, in particular a running gear seal, at least comprising a slide ring, which is in operative connection with a counter running surface, in particular a counter ring, the slide ring having a sliding surface and an accommodating area for an elastomer spring element, at least the sliding surface of the slide ring being provided with a convex contour.

11 Claims, 3 Drawing Sheets

(56) References Cited

U.S. PATENT DOCUMENTS

Figure 1:
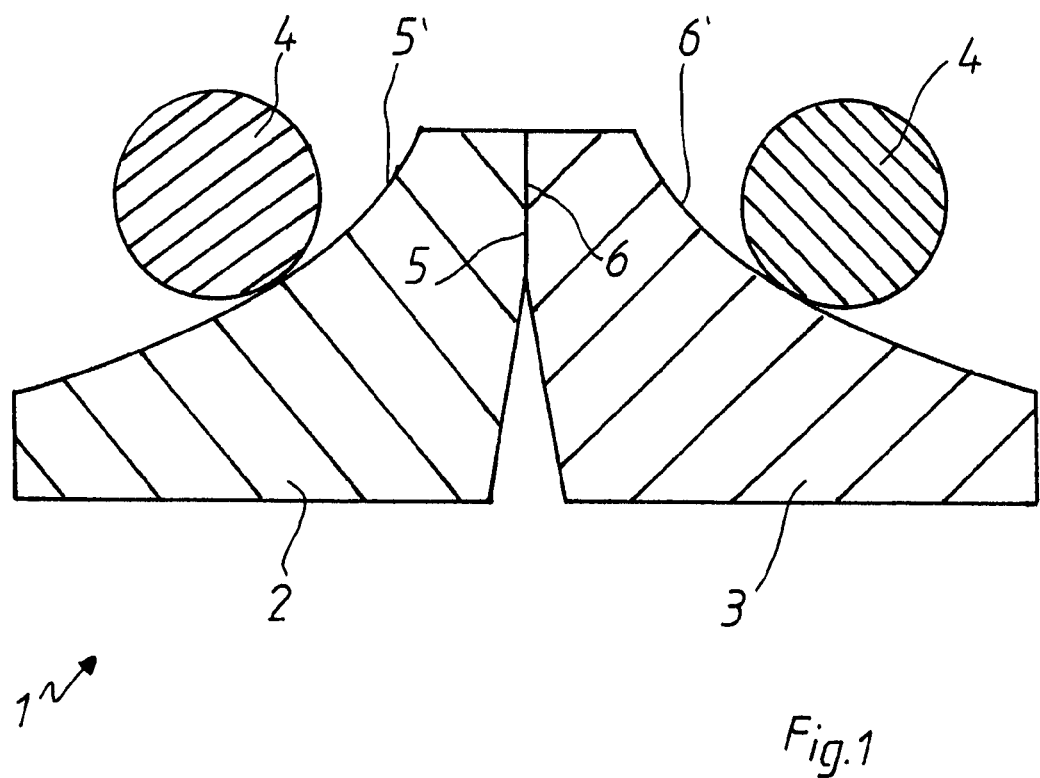

| | | | | |
|---|---|---|---|---|
| 4,111,436 | A | * | 9/1978 | Yazawa .................. B62D 55/15 |
| | | | | 277/381 |
| 4,189,159 | A | * | 2/1980 | Domes et al. ................ 277/374 |
| 5,129,688 | A | * | 7/1992 | McGarvey .......... F16L 19/0231 |
| | | | | 277/608 |
| 5,544,896 | A | | 8/1996 | Draskovich et al. |
| 7,093,836 | B2 | * | 8/2006 | Tsuboi ................... F16J 15/344 |
| | | | | 277/358 |
| 2007/0045966 | A1 | * | 3/2007 | Jiang ..................... F16J 15/344 |
| | | | | 277/404 |

FOREIGN PATENT DOCUMENTS

| | | | |
|---|---|---|---|
| DE | 3141512 A1 * | 5/1983 | .............. F16J 15/34 |
| DE | 10155653 C2 | 5/2003 | |
| DE | 102004036974 B3 | 4/2005 | |
| EP | 0779457 A1 | 6/1997 | |

OTHER PUBLICATIONS

Angular—definition by The Free Dictionary.*
Radius of curvature—definition by The Free Dictionary.*
Convex—definition by The Free Dictionary.*

* cited by examiner

SLIDE RING SEAL

TECHNICAL FIELD

The invention relates to a slide ring seal.

RELATED ART

Slide ring seals developed as running gear seals are in particular often used for the sealing of drives, as well as propulsion or downthrust for low peripheral speeds of up to approx. 10 m/s, while ensuring a static seal to the air side. The slide and/or counter rings of running gear seals are made of hard and wear-resistant metallic materials (stellite, steel, duronit, and similar materials).

DE 101 55 653 C2 discloses a slide ring seal, in particular a running gear seal, comprising an angular slide ring and counter ring, which form a sealing surface with their radial seal legs, and seal bodies made of elastomeric material, which are positioned between the housing containing the slide ring seal and the radial external surface of the axial legs of the slide and counter ring.

DE 10 2004 036 974 describes a slide ring seal, in particular a running gear seal, described, including a counter ring and a slide ring, each with a sliding surface to accommodate an elastomer spring element, a housing assigned to the counter ring and slide ring with a counter running surface for the spring element, with the housings being connected concentrically to form a unit and an anti-twist protection device being provided in the area of the counter ring and slide ring.

As a result of EP 0 779 457 A1, a slide ring seal is already known, which consists of a slide ring and/or counter ring made of metallic material with a tapered surrounding surface intended to receive an elastic rolling element. The outside surface of the slide ring and/or counter ring that is turned to the medium is coated with a baked on powder coating.

DE 31 41 512 A1 shows a slide ring and/or a counter ring with a slide ring seal. This slide ring seal is equipped with a secondary sealing location on the medium side in the area of the slide ring and/or counter ring, which consists of an O ring and a supporting ring if necessary.

DE 1 928 675 describes a contact-free mechanical seal equipped with packaging. The sliding surface of one of the rings is formed in a slightly convex manner by means of a lapping process in order to create the necessary wedge-shaped space on the outer radial areas of the sealing ring, with the separation of the areas being initiated and maintained during operation.

In the same way, U.S. Pat. No. 3,905,606 also shows a seal that acts without contact in which the slide ring, which can be moved axially and is secured to a housing, has a convex curved profile, the radiuses of curvature of which gradually decrease from the interior diameter to the external diameter of the ring.

U.S. Pat. No. 554,896 relates to a slide ring seal, in which the sealing surfaces of the slide and counter rings lie completely on top of each other and at least one of the sealing rings is made from a composite material.

SUMMARY OF THE INVENTION

The aim of the invention is to extend the technical field of application of, in particular running gear seals, so that they can also be used for peripheral speeds above 10 m/s, in particular for peripheral speeds of up to 30 m/s and are capable of replacing the current radial shaft seals, which have a significantly shorter useful life.

This aim is achieved in that at least the sliding surface of the slide ring is provided with a convex contour, with the convex-shaped contour being provided in the almost trapezoidal-shaped area of the sliding surface.

In its simplest form, the slide ring seal includes only a slide ring in operative connection with an elastomer spring element, in which the sliding surface is equipped the contour in accordance with the invention.

In principle, first of all, all geometric curve-shaped contours are addressed.

Of particular advantage is if the curvature is designed in the manner of a radius.

The slide ring seal in accordance with the invention can be used as a running gear seal for significantly higher peripheral speeds of up to 30 m/s and for this reason is capable of replacing the current radial shaft seals, which have a significantly shorter useful life.

Each contour is preferably produced by means of a polishing process or a turning operation on the sliding surface.

Depending on the application, it may be useful to provide the sliding surface with a low-friction coating. DLC, or PVD, or chrome are possible coatings. The technician will, depending on the application, select the appropriate type of coating.

A further idea in line with the invention is for the slide ring to be formed in a cross section in an approximately angular manner and to have a radially extending slide surface and a trapezoidal area running at an angle to that, with the slide surface being equipped with the convex-shaped contour in the almost trapezoidal area of the sliding surface.

A running gear seal often consists of a slide ring and a counter ring, with the sliding surfaces facing each other. A further idea in accordance with the invention is to equip the sliding surface of the slide ring and also the counter ring with the convex-shaped contour. It would be of particular advantage here for the contours of the sliding surface to be formed in a substantially similar manner.

The geometry of the running surface in accordance with the invention significantly reduces the surface pressure and in addition, there are also advantages with regard to possible misalignment problems between the sliding surface of the slide ring and the counter running surface, especially the counter running surface of the counter ring.

THE DRAWINGS

Figure 2:
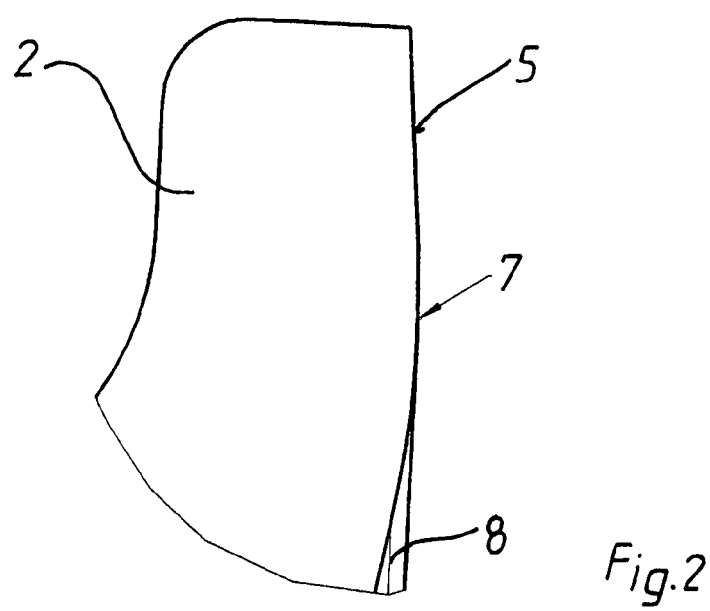
Figure 3:
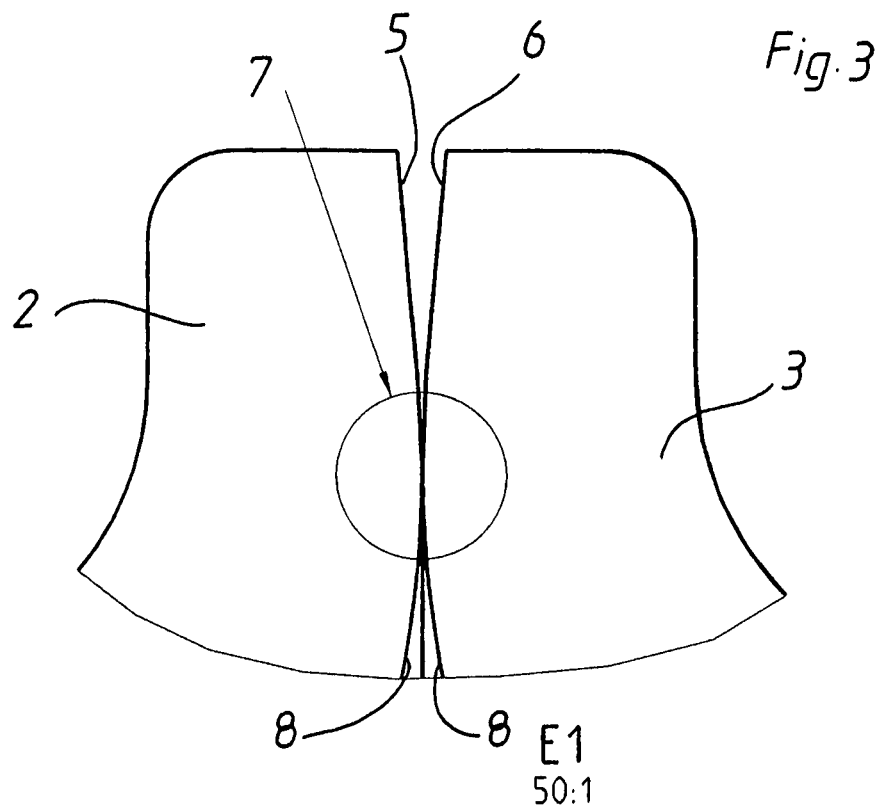
Figure 4:
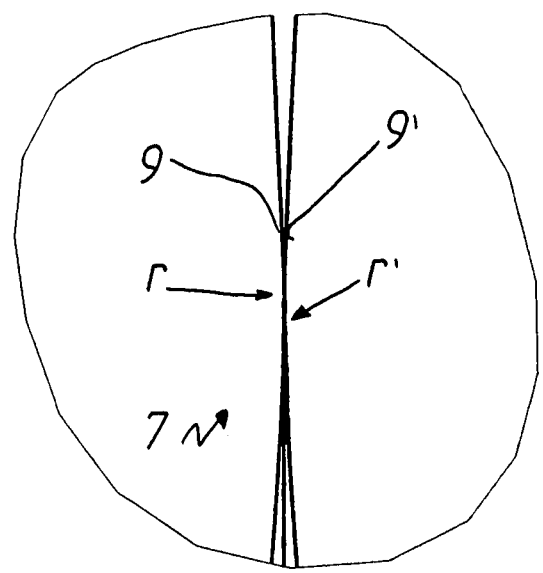
Figure 5:
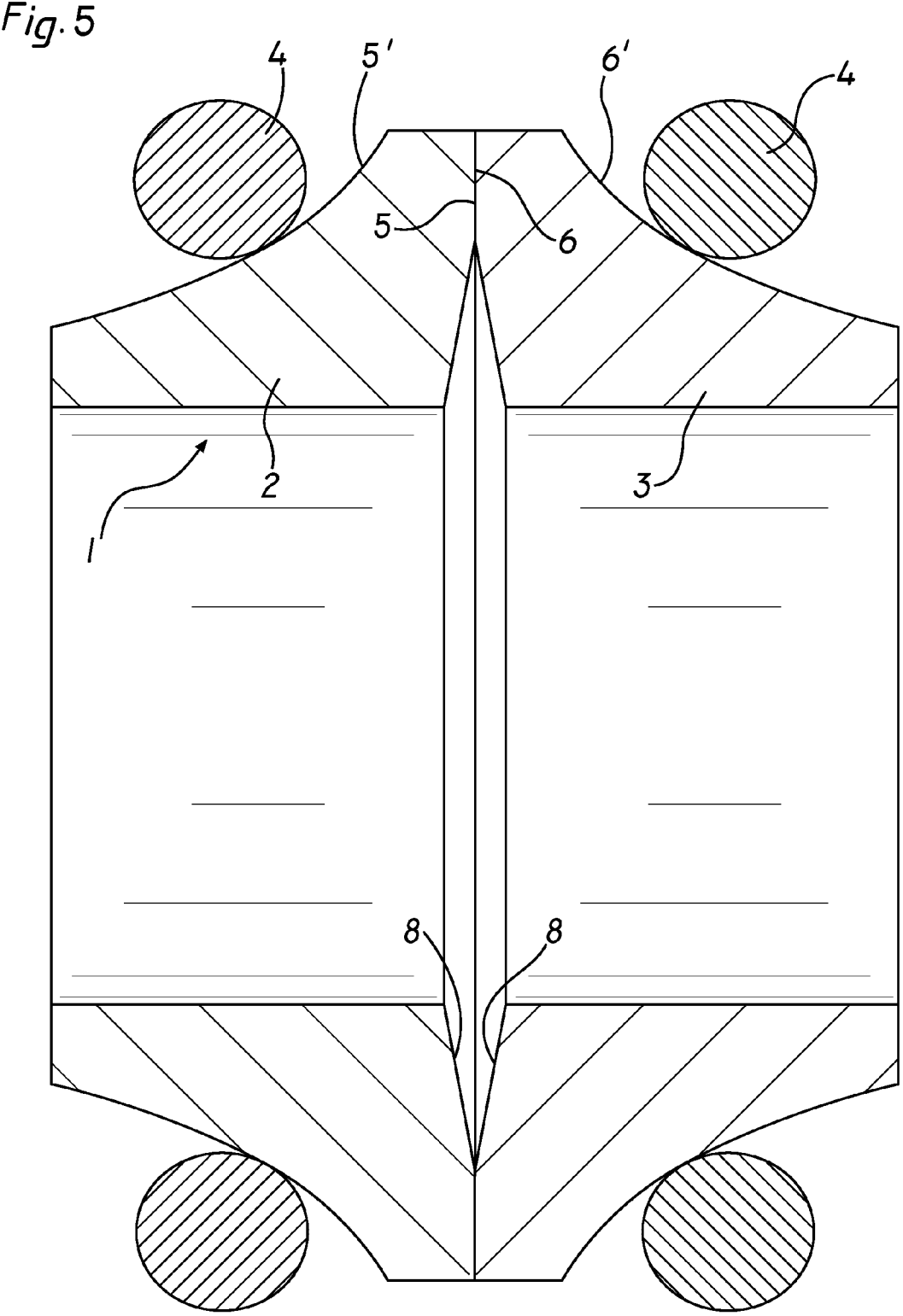

The subject of the invention is illustrated with an example of execution in the figures and is described as follows. The figures show:

FIG. 1 A cross-sectional view of a running gear seal including a slide and counter ring;

FIG. 2 A fragmentary view of the slide ring;

FIG. 3 A fragmentary view of the slide ring and counter ring;

FIG. 4 An enlarged fragmentary view of the sliding area between the slide ring and the counter ring; and FIG. 5 A cross-sectional view of the slide ring and the contour ring.

DETAILED DESCRIPTION

FIG. 1 shows a slide ring seal formed as a running gear seal 1, consisting of a slide ring 2, a counter ring 3, and an elastomer spring element 4 for each. The cross section of slide ring 2 and counter ring 3 is approximately angular and each ring has a sliding surface 5, 6 and a receiving area 5', 6' for the spring elements 4.

FIG. 2 shows a partial view of the slide ring 2. The sliding surface 5 can be seen. In that region of the sliding surface 5, which is marked with an arrow leader line, the sliding surface 5 is equipped with a convex-shaped contour 7. In this example, the sliding surface 5 runs in a radial direction and runs outside the sliding surface 5 into trapezoidal surface 8.

FIG. 3 shows an enlarged view of slide ring 2, the counter ring 3, the two sliding surfaces 5, 6 and the trapezoidal surfaces 8. The sliding surface section equipped with the convex-shaped contour 7 is circled.

FIG. 4 shows a 50-fold enlargement in area 7 in accordance with FIG. 3. In this area 7, also shown are radii r,r', which are equal in dimension. It is further shown that only the sliding surfaces 5, 6 are provided with a chromium coating 9, 9'.

The invention claimed is:

1. A slide ring seal comprising a slide ring that extends around an axis and is in operative contact with a counter running surface of a counter ring at a contact region, with the slide ring having a sliding surface for making operative contact with the counter running surface of the counter ring and a receiving area for an elastomer spring element in such a way that the cross section of the slide ring is generally angular, wherein the sliding surface includes a radially extending slide surface having convex contour region, wherein the convex contour region of the slide surface and the counter running surface of the counter ring are radiused at the contact region, wherein a trapezoidal area extends along a predetermined length at a generally constant angle relative to the axis radially inwardly from the convex contour region, and wherein the sliding surface of the slide ring and the counter running surface of the counter ring provide inner surfaces that are spaced from one another on one radial side of the contact region and outer surfaces that are spaced from one another on an opposite radial side of the contact region.

2. The slide ring seal according to claim 1, wherein the convex contour region is generated by means of a polishing process or a turning process on the sliding surface.

3. The slide ring seal according to claim 1, wherein the sliding surface is provided with a low friction coating.

4. The slide ring seal according to claim 3, wherein the coating is formed by a DLC, a PVD, or a chromium layer.

5. The slide ring seal according to claim 1, wherein the sliding surfaces of the slide ring and a counter-ring face each other and both are equipped with convex-shaped contour regions.

6. The slide ring seal according to claim 5 wherein the sliding surface contours of the slide ring and counter-ring are substantially identical.

7. The slide ring seal of claim 6, wherein the substantially identical sliding surface contours have equal radii.

8. The slide ring seal according to claim 5 wherein the sliding surface contours of the slide ring and counter-ring provide surfaces that are spaced from one another on opposite sides of the convex-shaped contour regions.

9. The slide ring seal as set forth in claim 1 wherein said elastomer spring element has a circular cross-sectional shape which extends continuously around the axis.

10. A slide ring seal assembly, comprising:
a slide ring extending around an axis and a counter ring extending around the axis;
said slide ring and said counter ring each having a sealing surface and a receiving surface, said sealing surfaces facing axially towards one another, and said receiving surfaces facing axially away from one another;
spring elements contacting said receiving surfaces of said slide ring and said counter ring and biasing said slide ring and said counter ring towards one another;
both of said spring elements being made of an elastomeric material;
each of said sealing surfaces presenting a first conical portion and a second conical portion;
said first and second conical portions converging towards one another as viewed in cross-section;
said first conical portion extending linearly at a generally constant angle relative to the axis as viewed in cross-section;
each of said sealing surfaces also presenting a curved contact portion which extends from said first conical portion to said second conical portion; and
said curved contact portions of said sealing surfaces of said slide ring and said counter ring being in contact with one another such that said first conical portions are spaced axially from one another on one radial side of said contact portions and said second conical portions are spaced axially from one another on an opposite radial side of said contact portions.

11. The slide ring seal assembly as set forth in claim 10 wherein each of said spring elements has a circular cross-sectional shape which extends continuously around the axis.

* * * * *